Figure 1:
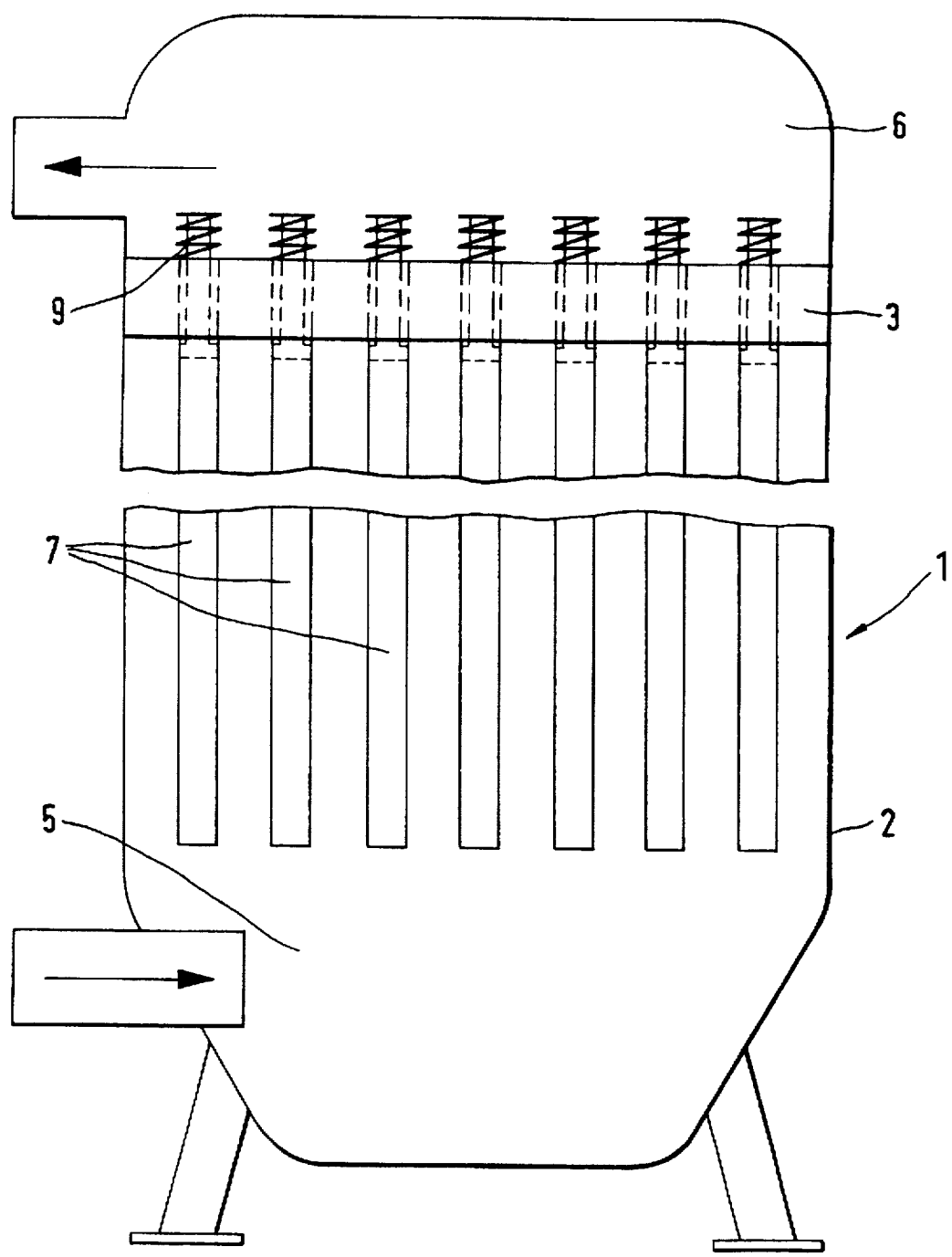

United States Patent [19]
Rech et al.

[11] Patent Number: 5,766,467
[45] Date of Patent: Jun. 16, 1998

[54] BACKFLUSHABLE FILTER ARRANGEMENT AND FILTER CANDLE

[75] Inventors: Raffaello Rech, St. Gallen; Erwin Baumann, Schwarzenbach, both of Switzerland

[73] Assignee: Filtrox-Werk AG, St. Gallen, Switzerland

[21] Appl. No.: 756,434

[22] Filed: Nov. 26, 1996

[30] Foreign Application Priority Data

May 31, 1996 [CH] Switzerland ............... 1375/96

[51] Int. Cl.⁶ ............................................. B01D 29/17
[52] U.S. Cl. ............................. 210/323.1; 210/323.2; 210/333.01; 210/359; 55/498; 55/508
[58] Field of Search ..................... 210/323.1, 323.2, 210/333.01, 333.1, 334, 350, 352, 359; 55/498, 508

[56] References Cited

U.S. PATENT DOCUMENTS

| | | | |
|---|---|---|---|
| 2,681,153 | 6/1954 | Armbrust | 210/333.01 |
| 2,772,786 | 12/1956 | Gardes | 210/333.01 |
| 3,373,104 | 3/1968 | Ryan | 210/352 |
| 4,123,356 | 10/1978 | Sugimoto et al. | 210/333.01 |
| 4,714,552 | 12/1987 | Tabor | 210/333.01 |
| 5,435,911 | 7/1995 | Hohle | 210/333.01 |

*Primary Examiner*—W. L. Walker
*Attorney, Agent, or Firm*—Shoemaker and Mattare,Ltd.

[57] ABSTRACT

A filter arrangement for backflushable filtration as well as a filter candle are formed in such a way that dead spaces and screw connections that are difficult to subject to backflushing are avoided, especially in the non-filtrate space (6). The filter candles (7) are held by a head portion (13). The head portion (13) is pressed against a holder arrangement (3) by means of tensioning means (9) arranged in the filtrate space (6). A support element (10) connects the head portion (13) with the tensioning means (9), said tensioning means (9) being able to bear against a contact surface (11) of the support element (10). The filtered liquid is led from the inside of the filter candle (7) through a flow-through channel (22) between the outside surface (20) of the support element (10) and the inside surface (21) of the opening (4) in the holder arrangement (3) into the filtrate space (5).

10 Claims, 6 Drawing Sheets

BACKFLUSHABLE FILTER ARRANGEMENT AND FILTER CANDLE

The invention concerns a backflushable filter arrangement and a filter candle according to the preamble of the independent patent claims.

For the filtration of liquids, in particular beverages such as beer, filter arrangements are frequently used which can be subjected to backflushing and which incorporate so-called settling filters comprising candle filters. Such filter arrangements are separated into a filtrate space and a non-filtrate space by a perforated plate possessing openings. Filter candles, in particular filter candles in which a layer of filtering auxiliary material is deposited, are affixed in the said openings. A typical filtering material to that purpose is Kieselguhr. In order that the liquid to be filtered can reach the filtrate space from the non-filtrate space, said liquid must flow through the layer of filtering material covering the surface of the filter candles, wherein particles in the liquid can be retained. Helical filter candles are frequently used wherein a wire is wound helically onto holder rods in such a way that a spacing of a precisely defined size (typically 40–100μ) is formed between the individual windings.

Such a filter is made known in EP 203 206, for example. A holder device is inserted into the openings in a perforated plate and the filter candle is screwed onto said holder device. The filter candle possesses an up-flow tube on its inside, through which the filtered liquid can rise from inside the filter candle into the filtrate space. It has now been demonstrated that on the one hand the screw connection and on the other hand the provision of an up-flow tube, in particular however the combination of these elements, can lead to various disadvantages. Especially in the case of filtration of beer and subsequent cold washin, which is used with increasing frequency, problems can arise through the accumulation of particles in the grooves of the screw connection and the corresponding growth of bacteria or fungi. Apart from that, dead spaces will arise between the outside surface of the up-flow tube and the inside surface of the holder device inserted in the openings in the perforated plate, said dead spaces being difficult to subject to backflushing and likewise liable to the accumulation of bacteria.

In the case of so-called settling filtration, a filtration aid is deposited to the outside surface of the filter candles. From time to time, the particles removed from the cleansed liquid require removal from the surface of the filter. To this end, the flow direction of the filter arrangement is reversed and the filter candles are flushed through with a cleansing medium in the reverse direction. By means of this backflushing, the filter cake on the surface of the filter candle is dislodged. With the prior art, however, in most cases neither the space between the up-flow tube and the holder device inserted into the openings of the perforated plate, nor the screw connections for affixing the filter candle to said holder device, will be subjected to flow-through. Particles which have been deposited in these spaces can be removed by backflushing only with difficulty.

A similar helical filter candle is made known in DE 41 01 168 that achieves fixation of the filter candles without the use of screw connections. The up-flow pipe possesses a head plate on both its ends. A pressure spring bears on the one hand against the filtrate-side of the perforated plate and on the other hand against the filtrate-side head plate of the up-flow pipe. The holder rods of the filter candle, said holder rods supporting the candle wall, are accommodated on the non-filtrate-side head plate of the up-flow pipe. A sealing arrangement is provided on the side of the holder rods oriented towards the perforated plate, said sealing arrangement surrounding the up-flow tube to form a seal and fitting into a tapered widening of the opening in the perforated plate. The force applied by the pressure spring is directed via the up-flow pipe and the holder rods onto the sealing device, by which means insertion of the up-flow tube into the perforated plate to form a seal becomes possible. This filter arrangement also possesses various disadvantages: particles can thus settle in the annular spacing between the outside of the up-flow tube and the openings in the perforated plate, these openings being difficult to flush through; on the other hand, the total force pressing on the sealing device is led via the wall of the filter candle. For this reason, it is not possible to select a pressing force without restriction, and excessive pressing force would lead to distortion of the holder rods and thus to a change of the spacing width of the candle wall.

It is the purpose of the invention to avoid the disadvantages of the prior art, and in particular to create in an economical way a filter arrangement which can be subjected to backflushing, as well as a filter candle which is simple to manufacture, mechanically stable and possesses no spaces in which particles can accumulate and no dead spaces which cannot be subjected to backflushing or which can be subjected to backflushing only with difficulty. It is a further purpose of the invention to create a backflushable filter arrangement and a filter candle by means of which an optimum seal between the filtrate space and the non-filtrate space is possible in the area of the openings of the perforated plate.

According to the invention, these purposes are fulfilled with a backflushable filter arrangement and with a filter candle possessing the features of the characterizing portion of the independent patent claims.

The backflushable filter arrangement possesses a housing with a holder arrangement possessing openings. The housing is separated into a filtrate space and a non-filtrate space and possesses at least one filter candle, said filter candle being arranged in the openings of the holder arrangement. The filter candle is held by a tensioning means to the holder arrangement and possesses a candle wall through which liquid can flow and which retains particles. Preferably, a helical filter candle is used.

The filter candles also possess a support element with a contact surface arranged on the filtrate side. The tensioning means on the one hand bear against the contact surface of the support element, and on the other hand against the filtrate side of the holder arrangement.

The support element is formed as a rod penetrating the opening of the holder arrangement. The filter candles possess a head portion provided with flow-through channels, said head portion being provided with a contact surface for sealing positioning on the non-filtrate side of the holder arrangement. Because the head portion is formed integrally with the support rod or is connected with said support rod, the contact surface acts as a counter surface to the contact surface of the support element, and the filter candle is held firmly on the holder arrangement by the tensioning means. Apart from that, the head portion is connected to the candle wall with an interlocking and/or a force fit. Accordingly, the filter candle is arranged to suspend freely within the non-filtrate space. Undesirable compression is thus avoided. With this arrangement, undesirable screw connections are also successfully avoided.

In another embodiment, the support rod of a filter candle is formed in such a way that a flow-through channel for guiding the filtrate from inside the filter candle into the filtrate space is formed between the outside surface of said support rod and the inside surface of the openings in a holder arrangement at least within segments of said openings. In this way, the dead spaces according to the prior art in the area of the surface of the openings in the perforated plate are avoided.

Although both the aforementioned embodiments each alone already possess their own advantages, it has now been shown that a combination of said embodiments will lead to a particularly advantageous result. On the one hand, by means of the specific holding of the filter candles, any screw connection will be avoided, and on the other hand, through formation of the flow-through channel between the support rod and the opening of the perforated plate, a particularly efficient backflushing will be ensured.

A particularly beneficial embodiment will result if the housing is separated into a filtrate space and a non-filtrate space by the holder arrangement possessing openings. The holder arrangement is in this case formed by a perforated plate.

The invention can be realised in a particularly simple way if the support rod on the inside of the filter candle protrudes into the inside of the filter candle and possesses on its non-filtrate end a distributor arrangement for distribution of the backflush flow onto the candle wall.

As a tensioning means, for example coil springs, spring washers or other bodies possessing sufficiently high elasticity can be used.

For raising of the throughput from inside the filter candle into the filtrate space, the support element can, apart from that, possess an additional vertical boring and be formed as an up-flow tube. To this end, a tubular support element is used possessing perforations on its outside surface distributed over the entire height, for intake and outlet of the filtered liquid.

The head portion supporting the filter candle can be annular in design. The supporting rod is lead through the inside of the ring and partially welded to the inside of the head portion. Advantageously, a cylindrical support rod is used, flattened on two sides. The flow-through channels for the liquid are formed between the flattened sides of the support rod and the inside surface of the head portion.

It is however also conceivable to form the head portion and the support bolt integrally, and to provide the head portion with borings for passage of the liquid.

A particularly effective seal between the head portion of the filter candle and the non-filtrate side of the perforated plate will result if an O-ring is inserted between the head portion and the perforated plate.

The filter candle, according to the invention, for a backflushable filter arrangement possesses a candle wall and a head portion holding said candle wall with an interlocking and/or force fit. The head portion is provided with flow-through channels for the filtrate and with a contact surface for sealing positioning onto the non-filtrate side of a holder arrangement of the backflushable filter arrangement. The head portion is integrally formed or connected with a support element, said support element being able to be led through the openings of a holder element of the filter arrangement. On the filtrate side, the support element possesses a contact side for tensioning means which can bear against the filtrate side of the holder arrangement. Screw connections can be effectively avoided by means of such an arrangement, without the filter candle being subjected to compression through the holder device.

A filter candle according to another embodiment of the invention likewise possesses a candle wall and a head portion holding said candle wall with an interlocking and/or force fit. The head portion likewise possesses flow-through channels. Said flow-through channels are arranged eccentrically around the vertical axis of the head portion. Apart from that, the head portion is connected to a support element. The outside surface of the support element possesses a maximum distance from the axis of the head portion, said distance being less than the minimum distance of the flow-through channels from the axis of the head portion. In principle, the support element is affixed to the head portion and surrounded by the flow-through channels in the head portion.

The invention is more closely explained in the following embodiments, and with the aid of the drawings: namely, FIG. 1 a filter arrangement possessing the features of theinvention, FIG. 2a a cross section through the upper portion of a filter candle according to FIG. 1, FIG. 2b a plan view of a filter candle along the line B—B in FIG. 2a, FIG. 2c a plan view of the filter arrangement according to FIG. 2a, FIG. 3 a cross section of the upper portion of a filter candle of an alternative embodiment, FIG. 4 a cross section of the upper portion of a filter candle of an alternative embodiment, FIGS. 5a and 5b a cross section and a plan view as in FIGS. 2b and 2c of an integrally formed head portion with a support element.

A filter arrangement 1 comprises in principle a housing 2 and a holder arrangement 3. The holder arrangement 3 is formed as a perforated plate and separates the housing 2 into a filtrate space 5 and a non-filtrate space 6. The holder arrangement 3 possesses openings 4 in which filter candles 7 are affixed. The filter candles 7 are clamped in position on the holder arrangement 3 by tensioning means 9.

FIG. 2 shows an upper portion of a filter candle 7 in cross section. The filter candle 7 possesses a head portion 13 and a candle wall 8. The candle wall 8 is connected with a force fit to the head portion 13. The head portion 13 is provided with flow-through channels 14 as well as a contact surface 15. The head portion 13 is annularly formed and on its inside integrally connected to a support element 10, in particular welded. The support element 10 is formed by a cylindrical rod flattened on two sides and connected by its non-flattened areas to the inside of the head portion 13. Apart from that, on the filtrate side the support element 10 possesses a limit stop 11.

The filter candle 7 is held by a holder arrangement 3. The holder arrangement 3 possesses openings 4 through which the support element 10 is led. The support element 10 is dimensioned in such a way that a flow-through channel 22 is formed between the inside surface 21 of the opening 4 and the outside surface 20 of th e support element t 10.

The filter candle 7, or its support element 10, is pressed onto the holder arrangement 3 with a tensioning means 9 in the form of a coil spring. The tensioning means 9 on the one hand bears against the contact surface 11 of the support element 10 and on the other hand against the filtrate side 12 of the holder arrangement 3. T he head portion 13 with its contact surface 15 forms a counter bearing and is pressed against the non-filtrate side 16 of the holder arrangement 3. In order to raise the sealing effect, an O-ring 28 is inserted between the holder arrangement 3 and the head portion 13.

A sealing connection between the upper edge of the candle wall 8 and the head portion 13 is attained with a sleeve 17 extending downward over the candle wall.

During the filtration process, the liquid passes from the non-filtrate space 5 through the candle wall 8 to the inside 23 of the filter candle 3, and with that is cleansed. The cleansed liquid is led into the filtrate space 6 via the flow-through channels 14 in the he ad portion 13 and via the flow-through channel 22 between the support element 10 and the holder arrangement 3. To cleanse the candle wall 8, the filter arrangement is subjected to backflushing with a cleansing agent. In order that the candle wall 9 is flushed through with th e cleansing agent as uniformly as possible, the support element 10 protrudes into the inside 23 of the filter candle 7 and possesses a distributor arrangement 25 at its lower end, for example in the form of a thickened, mushroom-shaped end.

Figure 2A:
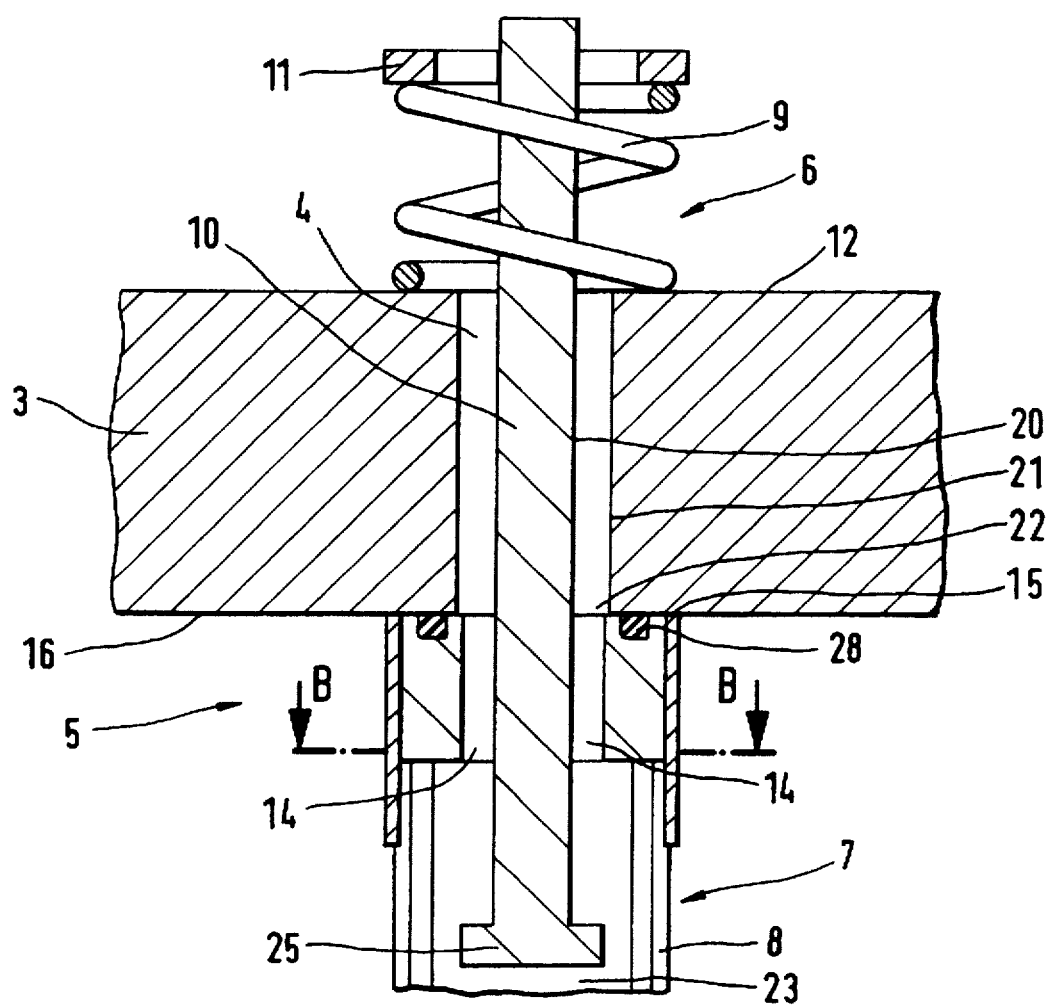
Figure 2B:
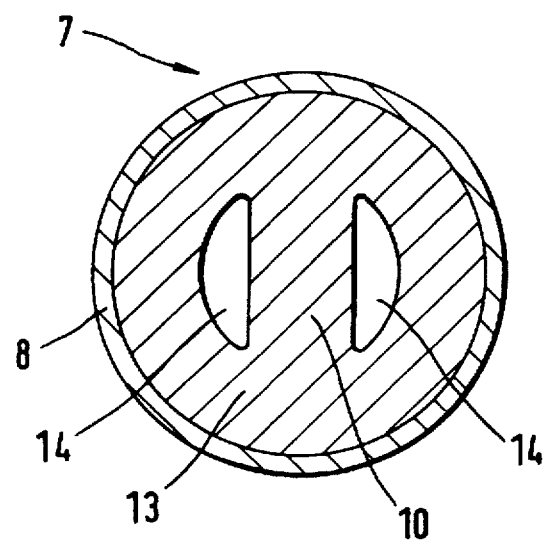

FIG. 2b shows a plan view of the arrangement shown in FIG. 2a along the line B—B. The support element 10 comprises a cylindrical rod with two flattened side surfaces. The support rod is inserted into the head portion 13 so that two flow-through channels 14 remain open. The head portion 13 is connected with an interlocking and/or force fit to the candle wall 8 of the candle filter 7.

Figure 2C:
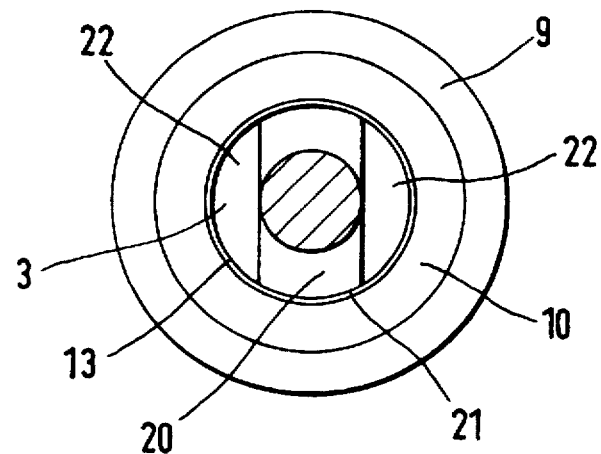

FIG. 2c shows a plan view of the arrangement according to FIG. 2a. A flow-through channel 22 is formed between the outside surface 20 of the support element 10 and the inside surface 21 of the holder arrangement 3. The filter candle 7 is held fast on the holder arrangement 3 with tensioning means 9.

Figure 3:
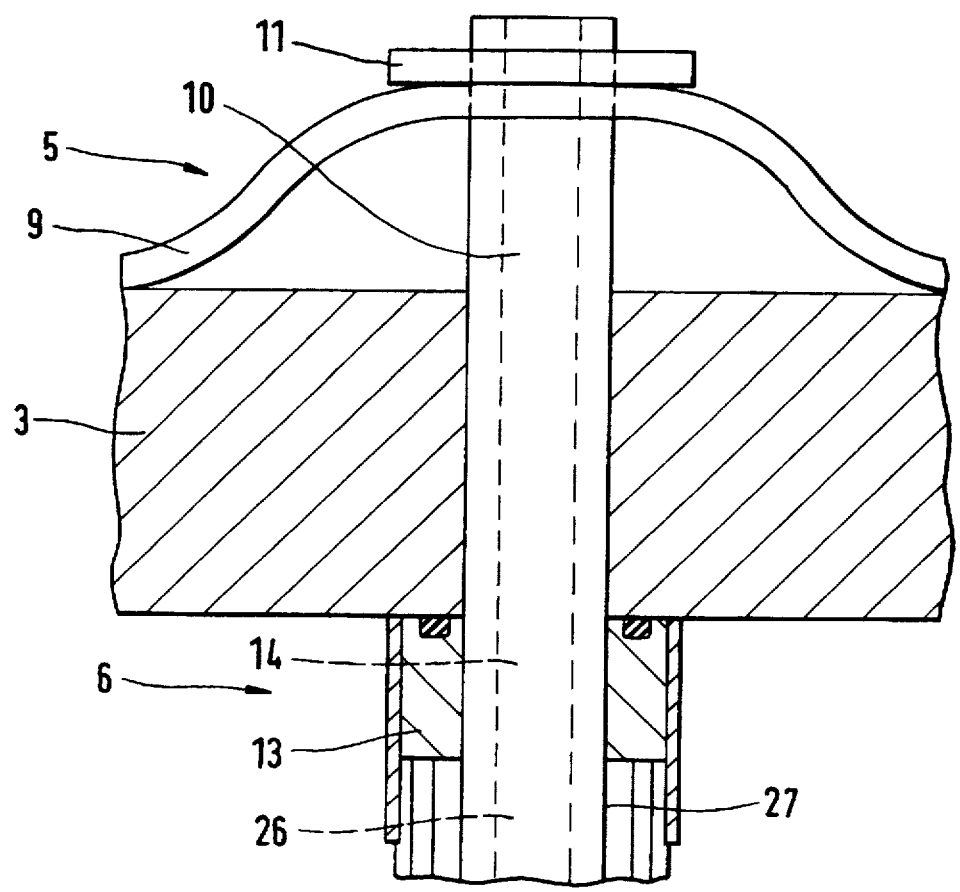

FIG. 3 shows a modified embodiment. The tensioning means 9 are formed as a spring washer and the support element 10 is formed as an up-flow tube 27. The up-flow tube 27 is inserted into the opening of the holder arrangement 3 with the most exact fit possible. Apart from that, the up-flow tube 27 is connected integrally to the head portion 13 and led through the flow-through channel 14 of the head portion 13.

It is also conceivable, however, to dimension the up-flow tube 27 according to FIG. 3 in such a way that a flow-through channel is formed between the outside surface of said up-flow tube 27 and the inside surface of the opening 4 of the holder arrangement 3. In this way, an optimal throughput of liquid can be attained without problems arising in the small annular spacing between the opening in the holder arrangement 3 and the up-flow tube 27.

Figure 4:
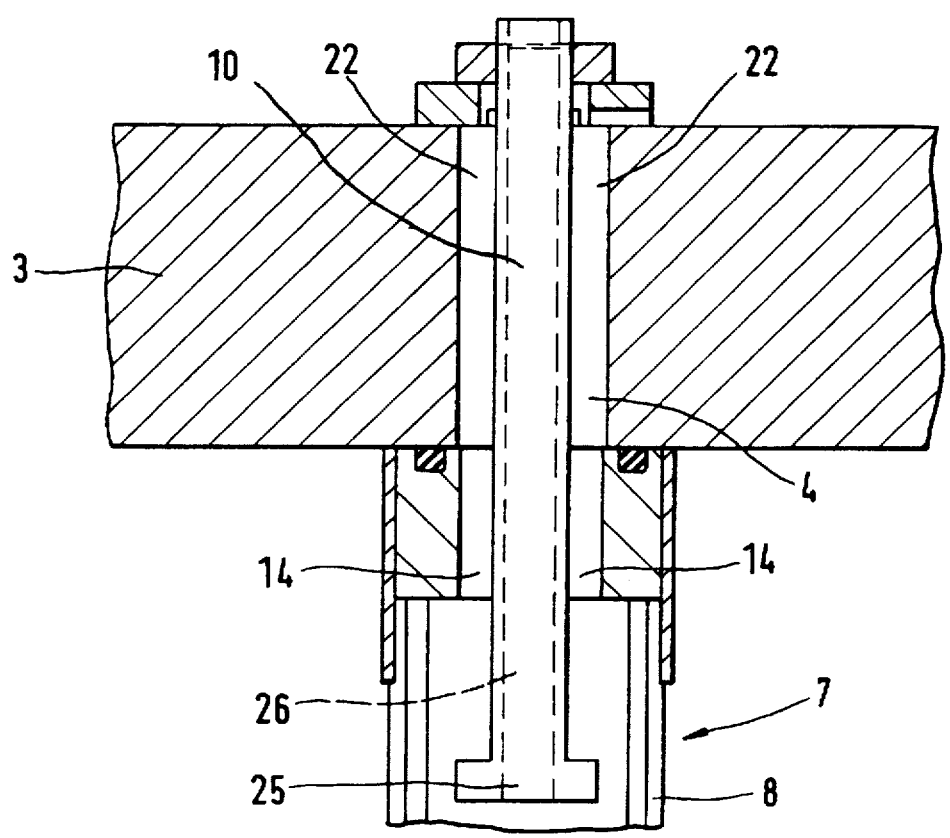

FIG. 4 shows an embodiment wherein such a combination can be seen. The support element 10 possesses an additional boring 26. In the embodiment according to FIG. 4, the support element 10 bears against the filtrate side of the holder arrangement by means of a screw device. In the embodiment according to FIG. 4, the non-filtrate space is likewise free of screw connections and dead spaces which can be subjected to backflushing only with difficulty are avoided.

Figure 5A:
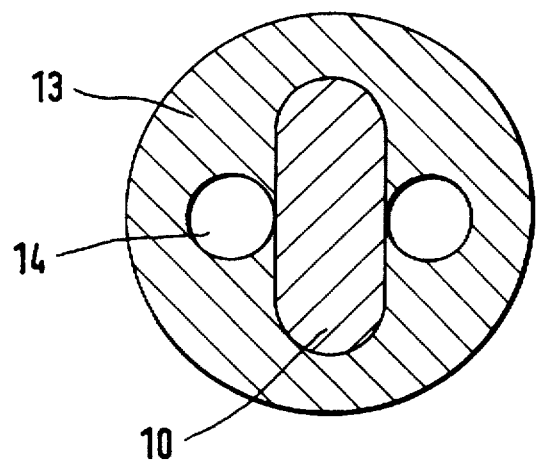
Figure 5B:
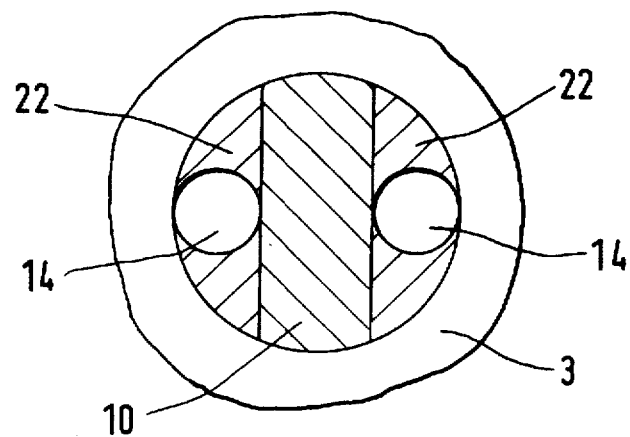

FIGS. 5a and 5b show arrangements that are similar to FIGS. 2b and 2c, wherein the head portion 13 and the support element 10 are formed integrally, the flow-through channels 14 being formed by borings in the head portion 13.

The contact surface 11 on the filtrate end of the support element 10 is preferably formed by a fastening disc that can be locked through rotation. It would also be conceivable to use any fastening devices known to the expert in the art, such as snap-on rings, pins passing through the support element, or screw-on connectors.

By means of the specific construction of the filter arrangement or the filter candle according to the invention, a filter arrangement is attained wherein dead spaces that are difficult to subject to backflushing are largely avoided and/or wherein problematic screw connections are avoided. With such a filter arrangement also the cold filtration of liquids such as beer and cold washing is possible without the risk of bacteria accumulating on the inside of the filter arrangement.

Inasmuch as the invention is subject to modifications and variations, the foregoing description and accompanying drawings should not be regarded as limiting the invention, which is defined by the following claims and various combinations thereof:

We claim:

1. A backflushable filter arrangement for settling filtration of beverages comprising a housing;

a holder arrangement possessing openings formed therein and dividing said housing into a filtrate space and a non-filtrate space;

at least one filter candle arranged to suspend in said openings of said holder arrangement, said filter candle possessing a candle wall and a support element with a contact surface arranged within said filter space;

spring means for fixing said filter candle in said holder arrangement, said spring means bearing against a surface of the holder arrangement directed towards said filtrate space;

said support element consisting of a support rod penetrating said opening of said holder arrangement and having a free end arranged within said filter candle;

said filter candle possessing head portion provided with flow-through channels and a contact surface for sealingly engaging a surface of the holder arrangement directed towards the non-filtrate side; and wherein said head portion is formed or connected integrally with said support rod and is a rod and is fixed to said candle wall with an interlocking force fit.

2. A filter arrangement according to claim 1, characterized in that said holder arrangement (3) is a perforated plate separating said housing (2) into a filtrate space (5) and a non-filtrate space (6).

3. A filter arrangement according to claim 1, characterized in that the support rod (10) protrudes into the inside (23) of the filter candle and possesses a distributor arrangement (25) on the non-filtrate side for distributing a backflush flow onto the candle wall (8).

4. A device according to claim 1, characterized in that the spring means (9) is a coil spring.

5. A device according to claim 1, characterized in that the spring means (9) is a spring washer.

6. A filter arrangement according to claim 1, characterized in that the support rod (10) possesses a vertical additional boring (26) and is formed as an up-flow tube (27).

7. A device according to claim 1, characterized in that the head portion (13) is formed annularly and is welded to the support rod (10).

8. A filter arrangement according to claim 1, characterized in that the head portion (13) and the support rod (10) are formed integrally, wherein the head portion (13) is provided with at least one boring.

9. A filter arrangement according to claim 1, characterized in that a sealing means, in particular an O-ring (28), is arranged between the holder arrangement (3) and the head portion (13).

10. A filter candle for a backflushable filter arrangement for settling filtration of beverages, comprising a candle wall;

a head portion holding said candle wall with an interlocking force fit, said head portion possessing flow-through channels and a contact surface for sealingly engaging a surface of holder arrangement of said backflushable filter arrangement oriented towards a non-filtrate space of said backflushable filter arrangement;

said head portion being formed or connected integrally with a support element, said support element being able to be lead through openings formed in said holder arrangement and having a free end arranged within said filter candle; and said support element possessing a contact surface for spring means, said spring means being adapted to bear against a surface of said holder arrangement oriented towards a filtrate space of said backflushable filter arrangement.

* * * * *